United States Patent [19]

Pan

[11] Patent Number: 5,208,876
[45] Date of Patent: May 4, 1993

[54] OPTICAL ISOLATOR

[75] Inventor: Jing-Jong Pan, San Jose, Calif.

[73] Assignee: E-Tek Dynamics, Inc., San Jose, Calif.

[21] Appl. No.: 786,434

[22] Filed: Nov. 1, 1991

[51] Int. Cl.$^5$ ................................................ G02B 6/32
[52] U.S. Cl. ...................................................... 385/11
[58] Field of Search ..................................... 385/11–12

[56] References Cited

U.S. PATENT DOCUMENTS 5,044,713  9/1991  Mozer et al. ........................... 385/11
5,082,343  1/1992  Coult et al. ............................ 385/34

Primary Examiner—Akm E. Ullah
Attorney, Agent, or Firm—Townsend and Townsend

[57] ABSTRACT

An improved optical isolator of the type having an input optical fiber, a first GRIN lens, a first polarizer, a optical rotator, a second polarizer, a second GRIN lens and an output optical fiber. Lithium niobate birefringent crystals are used for lowered costs and high performance. Improvements also include polishing the end of the input optical fiber at a slant and covering the end with a window coated with antireflection material. The surface of the GRIN lens facing the end of the input optical fiber is slant-polished reciprocally and spaced apart with gap which avoids Fabry-Perot interference.

20 Claims, 1 Drawing Sheet

OPTICAL ISOLATOR

BACKGROUND OF THE INVENTION

The present invention relates to optical fiber technology and, more particularly, to optical isolators useful in blocking reflections of optical signals generated by a laser through an optical fiber.

In present day optical fiber technology, semiconductor lasers are typically used to generate and relay light signals on optical fibers. These lasers are particularly susceptible to light signal reflections, which cause a laser to become unstable and noisy. Optical isolators are used to block these reflected signals from reaching the laser. Ideally, these optical isolators transmit all of the light signals in the forward direction and block all of the signals in the reverse direction.

Of course, optical isolators do not attain ideal performance levels and improvements are constantly sought for. Furthermore, optical fiber technology have an inherent large bandwidth which has encouraged the spread of optical fiber networks. However, one factor which has slowed the use of optical fiber technology has been costs, including those for optical isolators. With an optical isolator generally required for each laser generating signals on an optical fiber, it is highly desirable that the cost of the optical isolators be lowered as much as possible.

The present invention solves or substantially mitigates these problems by offering an optical isolator having higher performance with lower costs.

SUMMARY OF THE INVENTION

The present invention provides for an improved optical isolator for optical fibers. The isolator has a first sleeve for holding a first optical fiber, a first GRIN (Graded Index) lens, a first polarizer, an optical rotator, a second polarizer, a second GRIN lens and a second sleeve for holding a second optical fiber. At least one of said polarizers comprises a birefringent crystal of lithium niobate, which provides optical performances at least equal to birefringent crystals being used in optical isolators and which is far less expensive.

Furthermore, the present invention provides for GRIN lenses of optimized pitch length for superior optical performance than present optical isolators. Still another aspect of the present invention is placement of a window over the slanted end of the input optical fiber. The window is coated with antireflection material to reduce transmission loss.

DESCRIPTION OF THE PREFERRED EMBODIMENT

Figure 1:
FIG. 1 is a representative cross-sectional diagram of an optical isolator of a type presently in use.

FIG. 1 is a cross-sectional view of a representative optical isolator of a type presently being used. The optical isolator is placed in the path of an optical fiber, here shown as an input fiber 17 and an output fiber 18, to transmit light signals from the input fiber 17 to the output fiber 18 and to block light signals from the output fiber 18 to the input fiber 17.

The optical isolator has a glass ferrule 10 into which the input fiber 17 is inserted. The ferrule 10 helps align the fiber 17. Signals from the end of the input fiber 17 are transmitted by a first GRIN (Graded Index) lens 11 which collimates the light from the end of the fiber 17. The collimated light from the GRIN lens 11 is then passed through a polarizer 12 in the form of a birefringent crystal wedge. The polarizer 12 separates the incident light from the GRIN lens 11 into a ray polarized along the crystal's optical axis, ordinary ray, and a second ray polarized perpendicularly to the optical axis, extraordinary ray.

Separation occurs because the birefringent crystal has two indexes of refraction, one for the light polarized along the optical axis and another for the light polarized perpendicularly to the optical axis. The light from the polarizer 12 is then rotated by a Faraday rotator 13 which rotates the polarized light by 45°. The rotator 13 is typically formed from garnet doped with impurities or, alternatively, YIG, placed in a permanent magnet.

The rotated light is then recombined by a second polarizer 14, sometimes called an analyzer. Like the polarizer 12, the second polarizer 14 is formed by a birefringent crystal wedge. The optical axis of this birefringent crystal is oriented 45° with respect to the optical axis of the first polarizer 12. Thus the ordinary ray from the first polarizer 12 is also the ordinary ray of the second polarizer 14 and the extraordinary ray from the first polarizer 12 is the extraordinary ray of the second polarizer 14. The net result is that after traveling from the first polarizer 12 through the second polarizer 14, the two collimated rays are negligibly displaced from each other. The two rays are then combined and refocused by a second GRIN lens 15 to a point on the end of the output fiber 18. Again, the end of the output fiber 18 is aligned by a glass ferrule 16.

In the reverse direction, light from the output fiber 18 is separated by the polarizer 14 into two, an ordinary ray polarized along the optical axis of the polarizer 14, and an extraordinary ray polarized perpendicularly to the optical axis. When passing back through the Faraday rotator 13, the light in both rays is rotated 45°. This rotation is nonreciprocal with the rotation of light in the forward direction, so that the ordinary ray from the second polarizer 14 is polarized perpendicularly with the optical axis of the first polarizer 12 and the extraordinary ray from the second polarizer 14 is polarized with the optical axis of the first polarizer 12. The ordinary and extraordinary rays from the second polarizer 14 have swapped places incident upon the first polarizer 12. Because of this exchange, the light, having passed through the first polarizer 12, does not leave the polarizer 12 in parallel rays. The non-parallel light is focused by the GRIN lens 11 at points which are not located at the end of the input fiber 10. Thus light in the reverse direction is not passed back into the input fiber 10. For a more detailed explanation of this type of optical isolator, see, for example, "Compact Optical Isolator for Fibers Using Birefringent Wedges," M. Shirasaki and K. Asamo, *Applied Optics*, Vol. 21, No. 23, December 1982, pp. 4296–4299.

A long-standing problem in the practical implementation of optical fiber technology has been cost. In the manufacture of the optical isolator discussed above, costs are high due not only to the precision required in assembling the various elements of the isolator, but also the costs of the elements themselves. One of the most expensive elements is the birefringent crystal used for the polarizers 12 and 14. Presently, the birefringent crystals are formed from rutile (titanium dioxide), an expensive material with a very limited number of sources worldwide. A somewhat less expensive material which is sometimes used for the polarizing elements is calcite, which is still nonetheless expensive and has less desirable mechanical and chemical characteristics compared to that of rutile.

Despite these shortcomings in material costs and less than ideal characteristics of the materials, the manufacture of optical isolators has continued with rutile and calcite.

In the present invention, lithium niobate (LiNbO$_3$) is used for the polarizing elements 12 and 14. Table I below compares the properties of rutile, calcite and lithium niobate.

TABLE I

| Parameter | Rutile | Calcite | LINbO$_3$ |
| --- | --- | --- | --- |
| Refractive Index | (at $\lambda$ = 1.53 $\mu$m) | (at $\lambda$ = 1.50 $\mu$m) | (at $\lambda$ = 1.44 $\mu$m) |
| n$_e$ | 2.709 | 1.477 | 2.141 |
| n$_o$ | 2.451 | 1.635 | 2.215 |
| Melting Temperature (°C.) | 1820 | 900 | 1253 |
| Transmittance (%) | 70 | 80–95 | 78 |
| Thermal Expansion Coeff. (/°C.) | 7.14 × 10$^{-6}$ | 5.4 × 10$^{-6}$ | 7.5 × 10$^{-6}$ |
| Moh Hardness | 6–6.5 | 3 | 5 |
| Deliquescence | None | Weak | None |
| Acidproof | Strong | Weak | Strong |
| Relative Cost | 20 | 5 | 1 |
| Measured Insertion Loss (2 polarizers) | 0.2 dB | | 0.1 dB |

Of immediate interest are the costs of rutile and calcite compared to lithium niobate, here listed in arbitrary units. Lithium niobate is much less expensive than two other birefringent crystals, especially rutile.

Furthermore, lithium niobate has much better mechanical and chemical properties than that of calcite, the cheaper of the two birefringent crystals presently in use in optical isolators. Lithium niobate's thermal coefficient of expansion, which is close to that of rutile, makes lithium niobate polarizers a better match with the other elements of the optical isolator.

An important point is that lithium niobate is not deliquescent. On the other hand, calcite is weakly deliquescent. This is potentially disastrous because optical isolators are placed in many different environments, including environments with moisture, over long periods of time. Optical performance can be severely affected if the polarizers of an isolator start dissolving even slightly.

Additionally, calcite is not acidproof which further degrades its reliability as a material under actual conditions.

In terms of optical performance, lithium niobate has a good separation in its indices of refraction, n$_e$ and n$_o$. Though being far less expensive than rutile, lithium niobate has a higher transmittance, lower absorption losses, than rutile.

Figure 2:
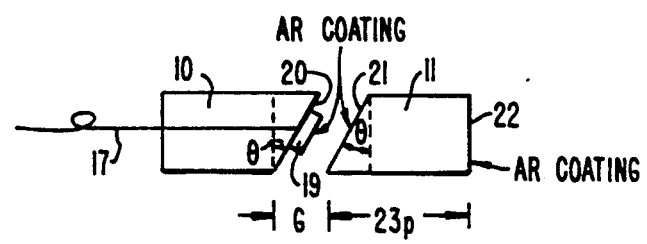
FIG. 2 illustrates an arrangement of an input fiber and GRIN lens according to the present invention.

Besides lithium niobate polarizers, the present invention offers other improvements which enhance optical performance. FIG. 2 illustrates the details of these improvements. For purposes of explanation, many of the reference numerals for the elements in the optical isolator in FIG. 1 are used for the elements in FIG. 2. As explained previously, the input fiber 17 is sealed in the glass ferrule 10. For improved optical performance, the end of the ferrule 10 and the end of the fiber 17 is slant-polished at an angle $\theta$ so that the tip of the fiber 17 does not end with a surface perpendicular to the long axis, or direction of travel, of the incoming light signals. A slight slant is made by polishing the end face 20 of the ferrule 17 (and the end of the glass ferrule 10) at a slight angle $\theta$, 8° to 12° from perpendicularity to the long axis of the fiber 17. This is shown in exaggerated fashion in FIG. 2.

The slant-polished end of the fiber 17 is covered by a window element 19 with an anti-reflection coating. The element 19 is formed by a thin pane of glass of 250 $\mu$m thickness. The glass, having an index of refraction of 1.46, is coated with an anti-reflection material, such as MgF. The thickness of the anti-reflection material can then be tested on the pane. If the coating on the pane is satisfactory, the pane is then diced into tiny windows 19 of 1.2 mm × 1.2 mm dimensions. One of the windows 19 is mounted over the end of the fiber 17 on the slant-faced end of the glass ferrule 10. A clear epoxy such as Norland 62 from Norland Products, Inc. of New Brunswick, N.J., may be used.

The face 21 of GRIN lens 11 facing the fiber 17 is also reciprocally slant-polished at the angle $\theta$ and GRIN lens 11 rotated so that the face 21 is aligned in a complementary fashion with the end of the glass ferrule 10. As in the case of the window 19 (and the input fiber 17), the slant-polished face 21 and back face 22 of the GRIN lens 11 are also anti-reflection coated over a sufficient spectral bandwidth to reduce insertion loss, as well as to minimize reflections at the surfaces. In fact, all faces of the elements of the optical isolator receive anti-reflection coatings to minimize mismatching losses.

The ferrule 10 (and the fiber 17) is separated from the GRIN lens 11 by a gap G. The gap, G, should be sufficiently large (>0.05 mm) in order to avoid undesired Fabry-Perot type interference. Such interference is extremely temperature dependent and causes thermal instability over a wide operational temperature range. It is important that such interference be avoided.

Figure 3:
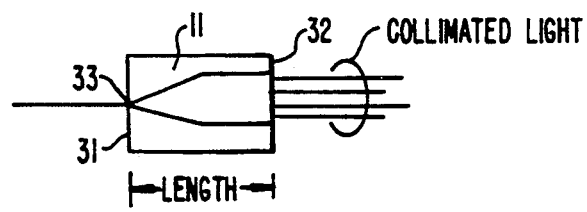
FIG. 3 is a detailed view of a GRIN lens of the optical isolator of FIG. 1.

In optical isolators heretofore, GRIN lens of $\frac{1}{4}$ pitch length have been used for the elements 11 and 15. FIG. 3 illustrates the idealized performance of the GRIN lens 11. Light from the input fiber 17 strikes the GRIN lens front surface 31 at a point 33. In the GRIN lens 11 the light is bent by the graded index of the GRIN lens to leave the back surface 32 supposedly collimated. However, it has been found that using a GRIN lens of a length 0.23 times the pitch is more effective than a GRIN lens of a length 0.25 times the pitch.

Table II below shows the experimental results of the optimum relationships between the angle θ, the gap G, and the pitch of the GRIN lens 11:

TABLE II

| θ | G (mm) | Pitch of GRIN Lens | Performance |
|---|---|---|---|
| 8° | 1.10 | 0.18 | Low Return Loss (<-60 dB) Low Insertion Loss* (<0.35 dB) |
| 10° | 0.250 | 0.23 | Low Return Loss (<-65 dB) Low Insertion Loss* (<0.35 dB) |

*Total insertion loss of two sets of slanted-polished GRIN lenses, fibers and windows.

The reason for the discrepancy between the theoretically predicted optimum GRIN lens of 0.25 pitch and the actually observed optimum GRIN lens of 0.23 pitch is believed to be that, in practical terms, the light from a fiber does not appear as a true point source at the surface on the GRIN lens. This appears to be true whether the GRIN lens front surface 31 is flat or slanted.

This discrepancy illustrates the problems between theory and the practical implementation of optical isolators. The collimation of light from the fiber 17 depends upon many factors, including the numeral aperture of the fiber 17, the slant angle θ, the material (refractive index), thickness and anti-reflection coating of the window 19, the gap G, and the characteristics of the GRIN lens 11. Theoretical analysis and computation may be calculated with formulas, such as given in "Coupling Characteristics Between Single-Mode Fiber and Square Law Medium," R. Kishimoto and M. Koyama, *IEEE Transactions on Microwave Theory and Techniques*, June 1982, pp. 882-893. However, theory does not necessarily lead to practical solutions.

The teachings of the angle θ, the gap G, the pitch of the GRIN lens, and anti-reflection coated window according to the present invention are also be applied to the output side of the optical isolator to obtain maximum optical performance. In other words, the GRIN lens 15, sleeve 16 and output fiber 18 in FIG. 1 are modified in accordance with the description with respect to FIGS. 2 and 3.

Another place where theory has had limited application is the dual-stage optical isolator. Theoretical calculations have shown that by placing two optical isolators in tandem, optical performance is greatly enhanced. However, thus far no high-performance, dual-stage optical isolators have been built because the optical performance of single stage isolators have been so poor. Any dual-stage isolator are of dubious value. While single stage isolators heretofore have been able to achieve satisfactory optical performances under a particular set of operating conditions, optical performances fall off as the operating conditions are changed. This degradation in performance is amplified in a dual-stage optical isolator.

Figure 4:
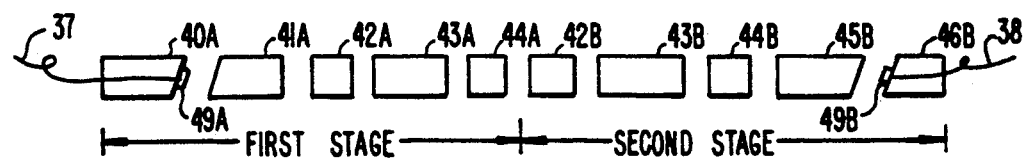
FIG. 4 illustrates an arrangement of a double-stage optical isolator according to the present invention.

On the other hand, a high-performance, dual-stage optical isolator may be achieved with the present invention. With the combination of the various improvements of the present invention, a single stage optical isolator having a return loss of less than −60 dB and isolation of 30−40 dB has been achieved capable of operating under a wide range of conditions. By coupling two of these isolators, as shown in FIG. 4, a high-performance and practical dual-stage optical isolator have been built. Isolation of greater than 60 dB have been attained.

The first stage has a glass ferrule 40A which receives an input fiber 37. The ferrule 40A is followed by a GRIN lens 41A, first polarizer 42A, Faraday rotator 43A, and second polarizer (analyzer) 44A. The second stage has a first polarizer 42B, Faraday rotator 43B, second polarizer 44B and a GRIN lens 45B. A glass ferrule 46B for an output fiber 38 completes the second stage.

Each stage incorporates the features of a single stage optical isolator and the improvements of the present invention. The end face of ferrule 40A of the first stage is slant-polished along with the end face of the input fiber 37. The end face of the input fiber 37 is covered by a window 49A which carries an antireflection coating. The first GRIN lens 41A has its front face polished in a reciprocal slant to the end face of the ferrule 40A. All of the faces of the elements of the optical isolator, including both front and back surfaces of the GRIN lens 41A are coated with antireflection material.

In the second stage of the optical isolator, including the first polarizer 42B, rotator 43B and second polarizer 44B, the GRIN lens 45B (of 0.23 pitch) combines to refocus the collimated ordinary and extraordinary light rays to a point on the end of the output fiber 38. As explained previously regarding single stage optical isolators, a window 49B covered with anti-reflection material is mounted over the end of the output fiber 38 in the sleeve 46B. The opposing faces of the GRIN lens 45B and the sleeve 46B (and end of the output fiber 38) are slant-polished at an angle θ, separated by a gap G, and aligned in a complementary fashion as shown in FIG. 4.

Finally it should be noted that the present invention offers a dual-stage optical isolator which is much cheaper to manufacture than a dual-stage optical isolator of present technology even if the present technology were capable of acceptable optical performance. A dual-stage optical isolator by its very nature contains twice the number of birefringent crystals for polarizers. With the present invention the advantage in cost savings of lithium niobate is multiplied.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. In an improved optical isolator for optical fibers having a first sleeve for holding a first optical fiber, a first GRIN lens, a first polarizer, an optical Faraday rotator, a second polarizer, a second GRIN lens and a second sleeve for holding a second optical fiber, the improvement wherein at least one of said polarizers comprises a birefringent crystal of lithium niobate.

2. The improved optical isolator as in claim 1 wherein said first and second polarizers comprise birefringent crystals of lithium niobate.

3. The improved optical isolator as in claim 2 further having a third polarizer, a second optical Faraday rotator, and a fourth polarizer between said second polarizer and said second GRIN lens, wherein said third and fourth polarizers comprise birefringent crystals of lithium niobate.

4. In an improved optical isolator having at least one birefringent crystal polarizing element, the improvement comprising a lithium niobate crystal as said polarizing element.

5. In an improved optical isolator for optical fibers having a first sleeve for holding a first optical fiber, a first GRIN lens, a first polarizer, a optical rotator, a second polarizer, a second GRIN lens and a second sleeve for holding a second optical fiber, the improvement comprising
said first sleeve and said first optical fiber having parallel longitudinal axes and coplanar end surfaces, said end surfaces at a slant with respect to a plane perpendicular to said longitudinal axes;
said first GRIN lens having a longitudinal axis coincident with said longitudinal axis of said first optical fiber and having a surface facing said first sleeve and first optical fiber, said surface at a reciprocal slant with respect to said GRIN lens longitudinal axis so that said surface is parallel with said end surfaces; and
at least one of said GRIN lenses having a length of 0.23 pitch.

6. The improved optical isolator as in claim 5 further comprising a window mounted to said end surfaces and covering said end surface of said first optical fiber, said window coated with antireflection material.

7. The improved optical isolator as in claim 5 wherein said first GRIN lens surface is displaced from said end surfaces by a predetermined gap so that Fabry-Perot interference is minimized.

8. The improved optical isolator as in claim 7 wherein said gap is greater than 0.05 mm.

9. The improved optical isolator as in claim 5 wherein said end surfaces are slanted with respect to said plane perpendicular to said longitudinal axes at an angle in the range of 8° to 12°.

10. The improved optical isolator as in claim 5 wherein at least one of said polarizers comprises a birefringent crystal of lithium niobate.

11. In an improved optical isolator for optical fibers having a first sleeve for holding a first optical fiber, a first GRIN lens, a first polarizer, an optical Faraday rotator, a second polarizer, a second GRIN lens and a second sleeve for holding a second optical fiber, the improvement comprising
said first sleeve and said first optical fiber having parallel longitudinal axes and coplanar end surfaces, said end surfaces at a slant with respect to a plane perpendicular to said longitudinal axes;
a window mounted to said end surfaces and covering said end surface of said first optical fiber, said window coated with antireflection material;
said first GRIN lens having a longitudinal axis coincident with said longitudinal axis of said first optical fiber and having a surface facing said first sleeve and first optical fiber, said surface at a reciprocal slant with respect to said GRIN lens longitudinal axis so that said surface is parallel with said end surfaces, said first GRIN lens surface displaced from said end surfaces by a predetermined gap so that Fabry-Perot interference is minimized; and
at least one of said GRIN lenses having a length of 0.23 pitch.

12. The improved optical isolator as in claim 11 wherein said gap is greater than 0.05 mm.

13. The improved optical isolator as in claim 11 wherein said end surfaces are slanted with respect to said plane perpendicular to said longitudinal axes at an angle in the range of 8° to 12°.

14. The improved optical isolator as in claim 11 wherein at least one of said polarizers comprises a birefringent crystal of lithium niobate.

15. The improved optical isolator as in claim 11 further comprising
said second sleeve and said second optical fiber having parallel longitudinal axes and coplanar end surfaces, said end surfaces at a slant with respect to a plane perpendicular to said longitudinal axes;
a second window mounted to said end surfaces and covering said end surface of said second optical fiber, said second window coated with antireflection material;
said second GRIN lens having a longitudinal axis coincident with said longitudinal axis of said second optical fiber and having a surface facing said second sleeve and second optical fiber, said surface at a reciprocal slant with respect to said second GRIN lens longitudinal axis so that said surface is parallel with said end surfaces, said second GRIN lens surface displaced from said end surfaces by a predetermined gap so that Fabry-Perot interference is minimized.

16. The improved optical isolator as in claim 15 wherein said first and second GRIN lenses have lengths of 0.23 pitch.

17. The improved optical isolator as in claim 15 wherein said first and second polarizers comprise birefringent crystals of lithium niobate.

18. The improved optical isolator as in claim 11 further having a third polarizer, a second optical Faraday rotator, and a fourth polarizer between said second polarizer and said second GRIN lens, further comprising
said second sleeve and said second optical fiber having parallel longitudinal axes and coplanar end surfaces, said end surfaces at a slant with respect to a plane perpendicular to said longitudinal axes;
a second window mounted to said end surfaces and covering said end surface of said second optical fiber, said second window coated with antireflection material;
said second GRIN lens having a longitudinal axis coincident with said longitudinal axis of said second optical fiber and having a surface facing said second sleeve and second optical fiber, said surface at a reciprocal slant with respect to said second GRIN lens longitudinal axis so that said surface is parallel with said end surfaces, said second GRIN lens surface displaced from said end surfaces by a predetermined gap so that Fabry-Perot interference is minimized.

19. The improved optical isolator as in claim 18 wherein said first and second GRIN lenses have lengths of 0.23 pitch.

20. The improved optical isolator as in claim 18 wherein said first, second, third and fourth polarizers comprise birefringent crystals of lithium niobate.

* * * * *